Figure 1:
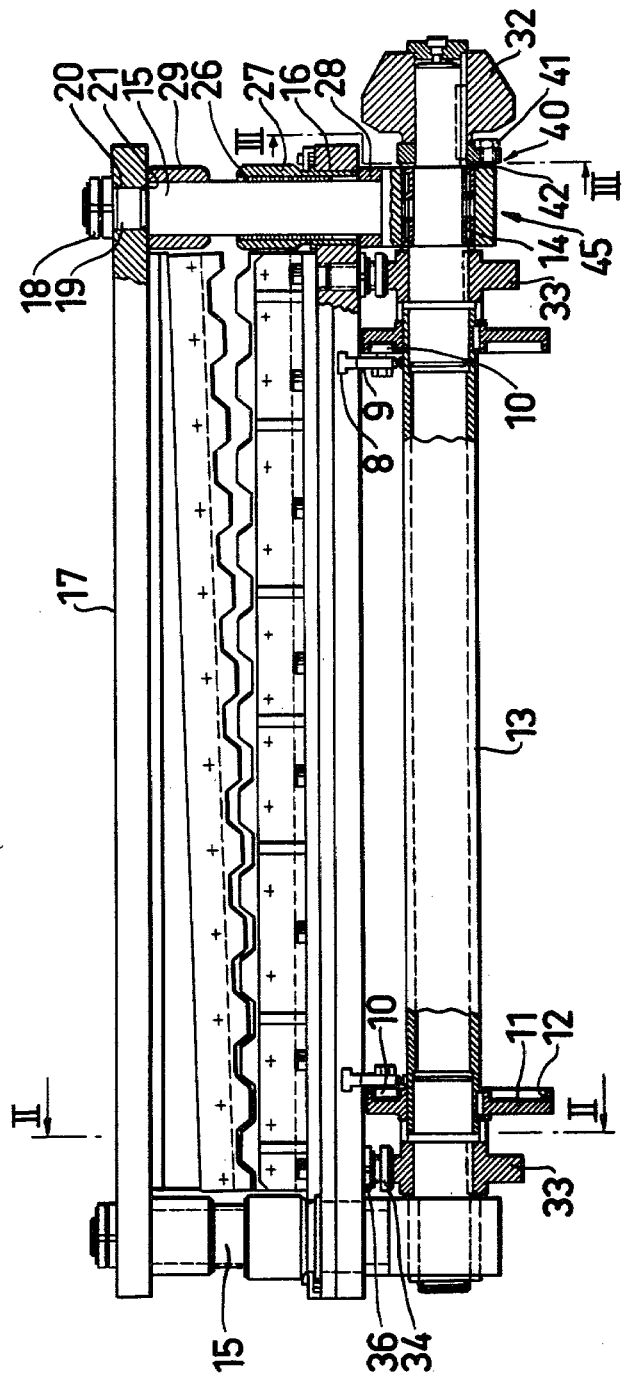

United States Patent [19]

Hofer

[11] 4,355,558

[45] Oct. 26, 1982

[54] SHEARS FOR SHEET METAL CUTTING

[75] Inventor: Leo Hofer, Piteå, Sweden

[73] Assignee: Nordtool AB, Ojebyn, Sweden

[21] Appl. No.: 158,637

[22] Filed: Jun. 11, 1980

[30] Foreign Application Priority Data

Jun. 21, 1979 [SE] Sweden ............................. 7905344

[51] Int. Cl.³ ........................ B26D 5/10; B26D 5/16
[52] U.S. Cl. .................................. 83/587; 83/590; 83/628
[58] Field of Search ............... 83/628, 624, 625, 626, 83/586, 587, 590

[56] References Cited

U.S. PATENT DOCUMENTS

| | | | |
|---|---|---|---|
| 58,778 | 10/1866 | Conarroe | 83/628 X |
| 115,493 | 5/1871 | May | 83/626 |
| 304,829 | 9/1884 | Knapp | 83/587 |
| 344,074 | 6/1888 | Bayrer | 83/590 X |
| 540,013 | 5/1895 | Alexander | 83/628 X |
| 592,564 | 10/1897 | Greenleaf | 83/626 X |
| 655,267 | 8/1900 | Obermeyer | 83/587 |
| 763,804 | 6/1904 | Seiberling et al. | 83/587 |
| 836,700 | 11/1906 | Oldenburg | 83/628 X |
| 1,722,819 | 7/1929 | Munschauer | 83/624 X |

FOREIGN PATENT DOCUMENTS

| | | | |
|---|---|---|---|
| 1462059 | 2/1966 | France | 83/628 |
| 2402 | of 1856 | United Kingdom | 83/624 |

*Primary Examiner*—James M. Meister
*Attorney, Agent, or Firm*—Cushman, Darby & Cushman

[57] ABSTRACT

The invention relates to a pair of shears for shearing sheet metal. Known shears, for example power shears, require relatively great forces, which cannot be produced except by special gear means. For rendering it possible to manually shear even relatively thick sheets, according to the invention it is proposed that the movable blade (22) of the shears is connected to a drive mechanism (13,15,17) and is located above the stationary blade (6) of the shears in its starting position for shearing, and that the drive mechanism is supported in the stand (1) of the shears for vertical movement, whereby the dead load of the drive mechanism and of the movable blade is utilized by gravity action for the shearing work.

10 Claims, 3 Drawing Figures

SHEARS FOR SHEET METAL CUTTING

This invention relates to a pair of shears for cutting sheet metal, comprising a frame with a shear blade rigidly attached thereto and a shear blade movable relative thereto, and a drive mechanism for said movable shear blade. Power shears as known are used for shearing sheet metal and/or cutting to size sheet metal details with straight edges. For such shearing and cutting operations relatively great forces are required which cannot be brought about manually except by using gear mechanisms. Known power shears, therefore, normally are driven hydraulically or electrically.

The object of the present invention, therefore, is to produce a shears for sheet metal shearing which can be operated manually for shearing sheet metal with a thickness of up to at least 2–3 mm. This object is achieved in principle in that the greater part of the dead weight of the shears is utilized for the shearing operation and thereby to a corresponding degree reduces the force to be supplied from outside. Said object, more precisely, is achieved in that the shears according to the invention have been given the characterizing features defined in the attached claims.

Figure 2:
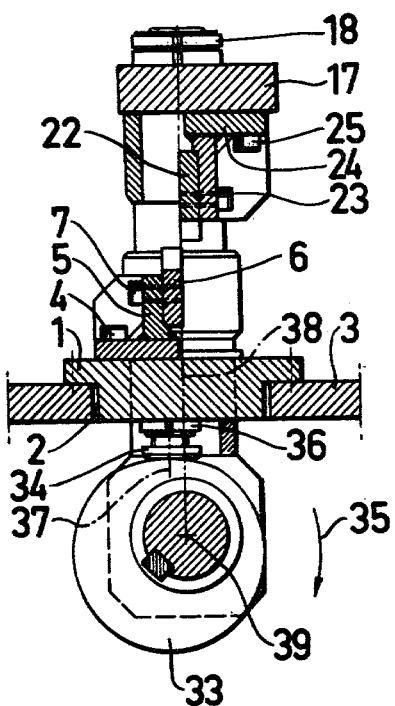
Figure 3:
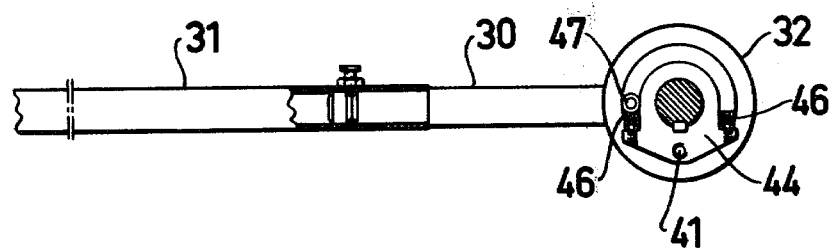

The invention is described in greater detail in the following, with reference to the accompanying drawings, in which FIG. 1 is a front view, partially in section, of a manually operated embodiment of the present shears, FIG. 2 is a section on a larger scale along substantially the line II—II in FIG. 1, and FIG. 3 is a section along the line III—III in FIG. 1.

The embodiment of the present shears for manual operation shown only by way of example in the drawing is built up on a plate 1 serving as a stand. The plate is shown so designed that it can be positioned in a slit 2 in a work-table 3 and be rigidly attached thereto, as indicated schematically in FIG. 2. On said stand plate 1 an angle-bracket 5 is detachably mounted by screws 4, and one blade 6 of the shears in the form of a stationary, horizontal lower blade is attached exchangeably to said bracket by screws 7. At the lower surface of the stand plate 1, runners 10 are suspended in spaced relationship by means of holders 9 fastened in grooves 8 in the plate, which runners co-act each with a lift-plate 11, or more exactly, with a run surface 12 formed inwardly in each lift-plate 11 and designed as an eccentric lift-curve. Said lift-plates 11 are mounted rigidly on the drive shaft 13 of the shears, which in the starting position of the shears shown in FIGS. 1 and 2 is supported by the runners 10 via the lift-plates 11.

The drive shaft 13 is supported in two vertical guide columns 15 by means of bearings 14, for example needle bearings. The columns include between themselves the lower blade 6 and extend through holes 16 in the stand plate 1, above which the columns are interconnected by a cross-piece 17, which like the drive shaft 13 is in parallel with the stand plate 1. The cross-piece 17 is retained by means of locking nuts 18 located on pegs 19, which are formed at the end of each guide column and extend through holes 20 in the cross-piece 17, which rests against a shoulder 21 on each guide column.

On said cross-piece the second blade 22 on the shears is attached exchangeably by screws 23 on an angle-bracket 24 between the columns 15, which bracket in its turn is connected detachably to the lower surface of the cross-piece by screws 25. Said second blade 22 on the shears at the embodiment shown is inclined relative to the stationary lower blade 6 of the shears, whereby sheet metal inserted between the blades is cut successively from one edge to the other, whereby as a result the necessary shearing forces are distributed uniformly.

Each guide-column 15 is guided by a ball-guide 26 and for vertical movement supported in a bushing 27, which is provided in the hole 16 in the stand-plate 1 and connected to said plate. On each guide-column also a lower distance sleeve 28 is located beneath the stand-plate 1, and an upper distance sleeve 29 is located between the cross-piece 17, which can be lifted and lowered relative to the stand-plate 1, and the bushing 27. The distance between the ends of the bushing and of the upper distance sleeve facing toward each other shall be at least equal to the distance, through which the movable upper blade 22 must be movable for cutting off a sheet with a width corresponding at least to the length of the blade.

As mentioned above, the guide-columns are vertically movable relative to the stand plate 1. Due to the fact, that both the upper piece 17 with associated angle-bracket 24 and blade 22 and the drive shaft 13 are connected to the guide-columns 15, a substantial downward force is obtained by the dead weight of these members, which force tends to draw the upper blade down and thereby, according to the principles constituting the basis of the invention, can be utilized as shearing force. Consequently, the force to be supplied from outside for carying out a shearing operation, can be reduced to a corresponding degree. Thereby the present shears also suitably can be operated manually, but of course they also may be power-driven.

For manual operation, at the embodiment shown a control lever 30 (FIG. 3) preferably provided with a detachable extension pipe 31 is connected to the drive shaft 13 via a holder 32 non-rotatably connected to said shaft for manually driving the same. For transferring the force hereby supplied to the upper movable blade 22, the shaft is provided with two eccentrics 33, which co-operate each with a counter-hold screw 34 located adjustably at the lower surface of the stand-plate, in order upon rotation of the drive shaft 13 in the direction indicated by arrow 35 in FIG. 2 to press the drive shaft 13 downward, whereby via the guide columns 15 also the upper blade 22 is drawn in downward direction for cutting off a sheet located between the blades 6 and 22. The counter-hold screws 34 are lockable in every set height position by locking nuts 36, and their vertical longitudinal axis 37 is slightly offset laterally relative to a vertical plane 38 through the rotation centre 39 of the drive shaft, as shown in FIG. 2. In said vertical plane, also the shearing or cutting cut takes place.

In order to retain the upper piece 17 with its blade 22 in the starting position shown in FIGS. 1 and 2 even when no sheet is inserted between the blades 6 and 22, the drive shaft 13 in this position is prevented in one way or another to rotate relative to the end of the guide-columns, which end is formed as a bearing housing 45 for the bearings 14. At the embodiment shown, this is brought about by means of a so-called spring-lock 40, which consists of a locking ball 42 spring-loaded in a screw 41 and by its spring held with a pressure, which is adapted to said downward force, in an impression in one side of the bearing housing. Said screw 14 is screwn into a plate 44, which is connected non-rotatably to the drive shaft 13, and which on both sides and in a plane through the rotation centre 39 of the shaft supports two set screws 46 for limiting the rotation of the drive shaft in co-operation with a peg 47 attached to the bearing housing. Said limitation of the maximum rotation of the drive shaft, of course, can be effected in many other ways, for example by means of the distance sleeves 28, 29.

The angle, through which the drive shaft 13 must be rotatable in order to cause the upper blade 22 to co-act with the lower blade 6 along its entire length, is determined by the pitch or eccentricity of the eccentrics. At the embodiment shown, said angle is slightly above 90°, i.e. the drive shaft 13 must be rotated through at least 90° for causing the upper blade 22 to be lowered beneath the lower blade 6 along its entire length. The run surfaces 12 of the lift-plates have the same eccentricity as the eccentrics 33, and their object is upon rotation of the drive shaft in the direction opposed to the direction indicated by arrow 35 to return the upper blade 22 to the starting position shown in FIGS. 1 and 2 by co-operation with the runners 10, and in said position, in which the drive shaft 13 is held locked against rotation by the spring-lock 40, to support the drive shaft 13, the guide columns 15 and the cross-piece 17 with its blade 22. These members can be said to constitute the drive mechanism of the present shears.

When shearing a sheet inserted between the blades 6,22, after the spring-lock 40 has been released by turning the drive shaft 13 slightly in the direction indicated by arrow 35 in FIG. 1, the upper blade 22 is lowered onto the sheet. Thereby the co-operation between the lift-plates 11 and runners 10 ceases to exist, and the drive mechanism 13,15,17 with its entire load presses down the upper inclined blade 22 against the sheet, thereby giving rise to a downward force, which acts automatically during the entire shearing operation and very substantially reduces the force, which is required to be supplied manually by turning the drive shaft 13 by means of the lever 30,31, and which is transferred to the upper blade 22 in that the eccentrics 33 of the drive shaft are caused to engage with the counter-hold screws 34. Hereby the upper blade 22 is caused to move downward and, thus, successively shears or cuts off the sheet. After said shearing, the drive mechanism is moved downward by action of gravity, but is caught by the runners 10, which by co-operation with the eccentric cam curve 12 of the lift-plates on the drive shaft 13 lifts the drive mechanism up to the starting position shown in FIGS. 1 and 2 when the drive shaft 13 is turned in the direction opposed to that shown in FIG. 2.

The present invention is not restricted to the embodiment described above and shown in the drawings, but can be altered, completed and modified in many different ways within the scope of the invention idea defined in the claims. The present shears, for example, can be adapted to motor operation, in which case, for example, a piston-cylinder means, preferably double-acting, turns the drive shaft. The shears also may be equipped with blades other than those shown, which are intended for shearing corrugated sheet metal, for example with straight blades.

I claim:

1. Shearing apparatus for shearing sheet material comprising: a horizontal stand; a lower stationary shearing blade rigidly attached to the stand; an upper shearing blade movable downwardly relative to the lower shearing blade to effect a shearing action; and a drive mechanism for supporting the movable blade and for raising and lowering the movable blade relative to the stationary blade, said drive mechanism including a horizontal shaft, mounting means vertically movable with respect to said stand and connected to said movable blade, said mounting means mounting said shaft for rotation about its axis and for vertical movement with said mounting means, means rotatable with said shaft for cooperating with said stand upon rotation of said shaft in one direction from a starting position to move said shaft, said mounting means and said movable blade downwardly relative to said stand whereby the weight of the movable blade and said drive mechanism is supported by said stand and whereby the dead weight of said drive mechanism and said movable blade is utilized by gravity action during downward shearing movement of the movable blade.

2. Shearing apparatus as in claim 11 including at least one lift-plate rotatable with said shaft having an internal eccentric cam surface, which co-operates with a runner suspended on said stand, in order upon rotation of said shaft in a direction opposed to the aforesaid one to return said drive mechanism and therewith the movable blade to said starting position after a shearing operation.

3. Shearing apparatus as in claim 2 wherein the co-operation between the lift-plates and runners ceases to exist, in that they are separated from each other when the movable blade meets resistance from a sheet to be to be cut.

4. Shearing apparatus as in claim 1 wherein said means rotatable with said shaft includes at least one eccentric cam.

5. Shearing apparatus as in claim 4 wherein said mounting means includes vertical guide columns carrying said shaft and mounted in the stand for vertical movement relative thereto, the columns being interconnected by a cross-piece carrying the movable shearing blade.

6. Shearing apparatus as in claim 5 wherein the vertical guide columns are supported in the stand by ball guides in order to prevent so-called drawer-chest effect and to achieve a high efficiency degree.

7. Shearing apparatus as in claim 1 wherein in said starting position for shearing, said shaft is locked by a predetermined force against rotation.

8. Shearing apparatus as in claim 2 wherein in the starting position for shearing, said drive mechanism is supported on the runners co-operating with the lift-plate and suspended on the stand.

9. Shearing apparatus as in claim 1 wherein the movable blade is inclined in relation to the blade which is rigidly connected to the stand.

10. Shearing apparatus as in claim 1 wherein the drive mechanism is capable for manual operation.

* * * * *